UNITED STATES PATENT OFFICE.

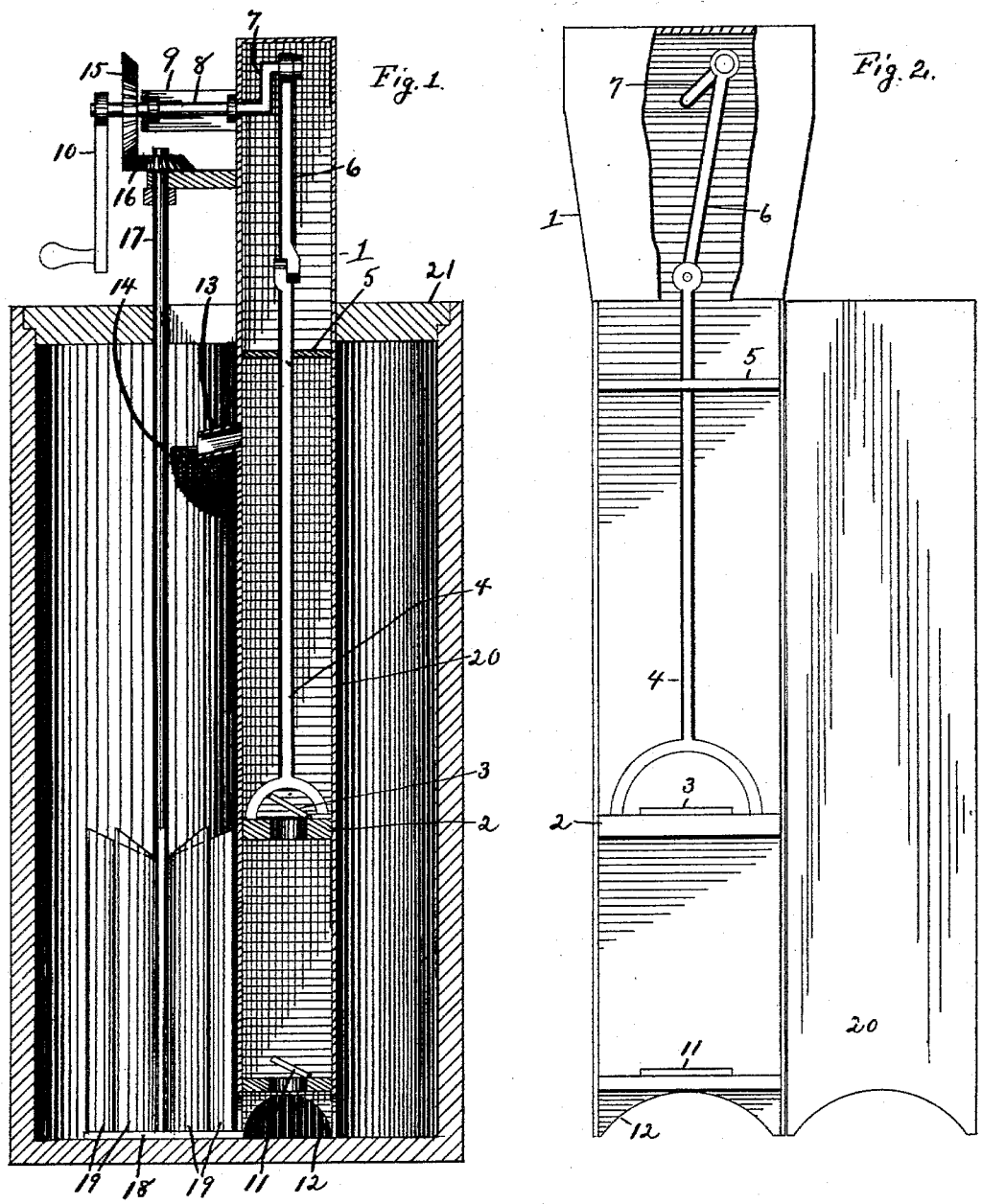

ROBERT T. KENNEDY AND SAMUEL W. KENNEDY, OF BRONWOOD, GEORGIA, ASSIGNORS OF ONE-THIRD TO J. W. GLASS, OF SAME PLACE.

CHURN.

SPECIFICATION forming part of Letters Patent No. 569,718, dated October 20, 1896.

Application filed November 27, 1895. Serial No. 570,496. (No model.)

*To all whom it may concern:*

Be it known that we, ROBERT T. KENNEDY and SAMUEL W. KENNEDY, citizens of the United States, residing at Bronwood, in the county of Terrell and State of Georgia, have invented a certain new, useful, and valuable Improvement in Pump-Churns, of which the following is a full, clear, and exact description.

Our invention has relation to pump-churns; and it consists in the novel construction and arrangement of its parts, as hereinafter described.

In the accompanying drawings, Figure 1 is a transverse sectional view of the churn, showing our invention, partly in section, located therein. Fig. 2 is a back view of the pumping apparatus, showing a hinged section open.

1 represents the pump-case. An ordinary piston 2, having a valve 3, is adapted to play up and down in the casing. The piston-rod 4 passes up through a guide 5 and is pivoted at its upper end to the lower end of a pitman 6. The upper end of the said pitman is journaled to the end of the crank-arm 7. The crank-arm 7 is formed on the inner end of the revolving shaft 8. Said shaft is journaled in the side of the casing 1 and a lateral extension 9, said extension being secured to the casing. The outer end of the shaft 8 is provided with the crank-handle 10, by means of which the shaft is revolved.

The lower part of the casing 1 is provided with a valve 11, and the extreme lower end of the casing is cut away, as at 12, to admit the liquid within the casing. The casing is also provided with the outlet 13, with the sieve-receptacle 14 located just below it.

The shaft 8 is provided with a beveled gear-wheel 15, which meshes with a horizontal beveled gear-wheel 16. Said wheel 16 is fixed to the upper end of the perpendicular shaft 17. The lower end of the shaft 17 is journaled in a plate 18, which is attached to the casing 1. The lower part of the shaft 17 is provided with a number of blades 19 19, which are adapted to revolve and churn the contents of the churn.

The back 20 of the casing 1 is hinged thereto and is adapted to be swung away therefrom, as shown in Fig. 2. Thus the interior of the casing can be reached for cleaning, repairing, &c.

The pump-casing 1 and its attachments and the churning-blades 19 19 and the shaft on which they are mounted and its attachments may be lifted perpendicularly from the body of the churn. If the top 21 is made in one piece with the said parts extending through the perforation in the top, the top will be removed at the same time that the said parts are removed. If, however, the top is made in two or more sections, the said sections may be removed and then the pump-casing, &c., may be lifted out of the body of the churn.

In operation the apparatus works as follows: It is placed in the churn, (a suitable perforation having been made in the churn-top 21 to receive the same,) as shown in Fig. 1, the milk having been first placed in the churn. The handle 10 is then revolved. This revolves the shaft 8, which in turn operates the pump and also revolves the blades 19 19. The blades 19 19 churn the milk into butter. At the same time the pump-piston 2 and valve 3 will elevate the milk and discharge it through the outlet 13. The butter that is formed will be caught in the sieve 14, while the milk will fall upon the blades 19 19 and is again churned. This passage of the milk through the air tends to purify the same.

Having described our invention, what we claim as new, and desire to secure by Letters Patent, is—

1. A pumping-churn consisting of a churning apparatus and a pump, the pump located within the body of the churn, a horizontal plate attached to the lower part of the pump-casing, a churning apparatus consisting of a revolving shaft having suitable blades, the lower end of said shaft being journaled in said horizontal plate, the upper end of said shaft also journaled in a lateral extension secured to the pump-casing, said pump adapted to elevate the milk and discharge the same within the churn-body, a suitable operating device attached to the top of the pump-casing and adapted to operate the churn and the pump, the churning apparatus, the pump and the operating device all adapted to be removed from the churn-body in an entirety.

2. A pumping-churn consisting of a churning apparatus and a pump, the pump located within the body of the churn, a horizontal plate attached to the lower part of the pump-casing; the back of the pump-casing being hinged to the remainder of the pump-casing; a churning apparatus consisting of a revolving shaft having suitable blades, the lower end of said shaft being journaled in said horizontal plate, the upper end of said shaft also journaled in a lateral extension secured to the pump-casing; said pump adapted to elevate the milk and discharge the same within the churn-body, a suitable operating device attached to the top of the pump-casing and adapted to operate the churn and the pump, the churning apparatus, the pump and the operating device all adapted to be removed from the churn in an entirety.

In testimony whereof we affix our signatures in presence of two witnesses.

ROBERT T. KENNEDY.
SAMUEL W. KENNEDY.

Witnesses:
J. F. CHILDS,
J. H. ELLERBEE.